(12) United States Patent
Perumalla et al.

(10) Patent No.: US 11,989,232 B2
(45) Date of Patent: May 21, 2024

(54) GENERATING REALISTIC REPRESENTATIONS OF LOCATIONS BY EMULATING AUDIO FOR IMAGES BASED ON CONTEXTUAL INFORMATION

(71) Applicant: International Business Machines Corporation, Armonk, NY (US)

(72) Inventors: Saraswathi Sailaja Perumalla, Visakhapatnam (IN); Shanthan Chamala, Malvern, PA (US); Venkata Vara Prasad Karri, Visakhapatnam (IN); Sairam Telukuntla, Westford, MA (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 17/090,939

(22) Filed: Nov. 6, 2020

(65) Prior Publication Data

US 2022/0147563 A1 May 12, 2022

(51) Int. Cl.
| | | |
|---|---|---|
| G06F 16/00 | (2019.01) | |
| G06F 7/00 | (2006.01) | |
| G06F 16/638 | (2019.01) | |
| G06F 16/687 | (2019.01) | |
| G06T 19/00 | (2011.01) | |
| H04R 23/00 | (2006.01) | |

(52) U.S. Cl.
CPC .......... *G06F 16/687* (2019.01); *G06F 16/638* (2019.01); *G06T 19/006* (2013.01); *H04R 23/008* (2013.01)

(58) Field of Classification Search
CPC ... G06F 16/687; G06F 16/638; G06T 19/006; H04R 23/008

USPC .......................................................... 707/722
See application file for complete search history.

(56) References Cited

U.S. PATENT DOCUMENTS

| | | | |
|---|---|---|---|
| 8,831,255 B2 | 9/2014 | Crawford | |
| 2009/0041428 A1* | 2/2009 | Jacoby | H04N 5/23245 |
| | | | 386/295 |

(Continued)

FOREIGN PATENT DOCUMENTS

| | | |
|---|---|---|
| CN | 109076303 A | 12/2018 |
| CN | 116349232 A | 6/2023 |

(Continued)

OTHER PUBLICATIONS

"Augmented Reality and Virtual Reality (AR & VR) Market Size is Expected to Reach USD 571.42 Billion by 2025", Valuates Reports, Feb. 13, 2020, 9 pages, <https://www.prnewswire.com/in/news-releases/augmented-reality-and-virtual-reality-ar-amp-vr-market-size-is-expected-to-reach-usd-571-42-billion-by-2025-valuates-reports-800630665.html>.

(Continued)

*Primary Examiner* — Raquel Perez-Arroyo
(74) *Attorney, Agent, or Firm* — Brian M. Restauro (57) ABSTRACT

Embodiments of the present invention provide methods, computer program products, and systems. Embodiments of the present invention can dynamically generate audio for one or more images associated with a location based on contextual information that satisfies a request. Embodiments of the present invention can embed the generated audio into the one or more images. Embodiments of the present invention can then display the one or more images with the embedded audio on a user device.

19 Claims, 4 Drawing Sheets

(56) References Cited

U.S. PATENT DOCUMENTS

| | | | | |
|---|---|---|---|---|
| 2009/0285407 | A1* | 11/2009 | Cragun | G06T 19/00 |
| | | | | 381/61 |
| 2012/0102066 | A1* | 4/2012 | Eronen | G06F 16/58 |
| | | | | 707/769 |
| 2012/0185769 | A1* | 7/2012 | Whitley | H04S 7/303 |
| | | | | 381/17 |
| 2012/0221687 | A1* | 8/2012 | Hunter | G06F 16/435 |
| | | | | 709/219 |
| 2015/0316640 | A1* | 11/2015 | Jarske | G01C 21/3874 |
| | | | | 381/56 |
| 2016/0014219 | A1* | 1/2016 | Harris | H04L 67/10 |
| | | | | 709/203 |
| 2017/0344854 | A1 | 11/2017 | Behringer | |
| 2018/0247624 | A1 | 8/2018 | Elkins | |
| 2019/0005128 | A1 | 1/2019 | Barari | |
| 2019/0253686 | A1 | 8/2019 | Bonner | |
| 2019/0318525 | A1* | 10/2019 | Schofield | G06F 3/165 |
| 2020/0250588 | A1* | 8/2020 | Zellner | G06Q 10/02 |
| 2021/0064217 | A1* | 3/2021 | Mildrew | G06F 3/04817 |
| 2021/0105563 | A1* | 4/2021 | Marten | H04N 21/439 |
| 2021/0329401 | A1* | 10/2021 | Zellner | H04S 7/304 |
| 2022/0163375 | A1* | 5/2022 | Arni | G01H 7/00 |

FOREIGN PATENT DOCUMENTS

| | | |
|---|---|---|
| GB | 2616368 A | 9/2023 |
| KR | 101857222 B1 | 5/2018 |
| TW | 201710982 A | 3/2017 |
| TW | 201738832 A | 11/2017 |
| WO | 2022095697 A1 | 5/2022 |

OTHER PUBLICATIONS

Digital Twin Market by Technology, Type (Product, Process, and System), Application (predictive maintenance, and others), Industry (Aerospace & Defense, Automotive & Transportation, Healthcare, and others ), and Geography, Global Forecast to 2026, Published Date: Sep. 2020 | Report Code: SE 5540, 12 pages, <https://www.marketsandmarkets.com/Market-Reports/digital-twin-market-225269522.html>.

Chenechal et al., "Laying out spaces with virtual reality", IEEE Virtual Reality Conference 2015, © 2015 IEEE, 2 pages.

Deaky et al., "Virtual Reality for Real Estate", 2017 4th Experiment@ International Conference (exp.at'17), © 2017 IEEE, 4 pages.

Hou et al., "The VR Model House Display of Real Estate", 2018 International Conference on Virtual Reality and Visualization (ICVRV), © 2018 IEEE, DOI 10.1109/ICVRV.2018.00051, 2 pages.

How 3D Digital Twin Technology Can Immediately Drive Up to 87% More Views of Your Real Estate Listing, Feb. 26, Downloaded Jun. 12, 2020, 3 pages, <https://www.get3d.com.au/this-technology-can-immediately-drive-up-to-87-more-views-of-your-real-estate-listing/>.

"How real estate sites are moving to AR/VR experience for home buyers and Builders?", CIS, Downloaded Jun. 12, 2020, 9 pages, <https://www.cisin.com/coffee-break/Enterprise/how-real-estate-sites-are-moving-to-ar-vr-experience-for-home-buyers-and-builders.html>.

Munzel et al., "Cardiovascular effects of environmental noise exposure", Accepted Jan. 13, 2014, doi: 10.1093/eurheartj/ehu030, 20 pages, <https://www.ncbi.nlm.nih.gov/pmc/articles/PMC3971384/>.

Russell, Gloria, "10 Important Features to Consider When Buying a House", Published: Oct. 30, 2017, 25 pages, <https://homeia.com/10-important-features-to-consider-when-buying-a-house/>.

"Patent Cooperation Treaty PCT Notification of Transmittal of the International Search Report and the Written Opinion of the International Searching Authority, or the Declaration", Applicant's file reference F21W0601, International application No. PCT/CN2021/124805, International filing date Oct. 20, 2021 (Oct. 20, 2021), Date of mailing Jan. 19, 2022 (Jan. 19, 2022), 9 pages.

* cited by examiner

GENERATING REALISTIC REPRESENTATIONS OF LOCATIONS BY EMULATING AUDIO FOR IMAGES BASED ON CONTEXTUAL INFORMATION

BACKGROUND

The present invention relates in general to audio emulation, and in particular to emulating audio using one or more Internet of Things (IoT) devices.

Virtual reality (VR) typically refers to a simulated experience that can be similar to or completely different from the real world. Applications of virtual reality can include entertainment and educational purposes. Other, distinct types of VR style technology include augmented reality and mixed reality. A person using virtual reality equipment is able to look around the artificial world, move around in it, and interact with virtual features or items. The effect is commonly created by VR headsets consisting of a head-mounted display with a small screen in front of the eyes but can also be created through specially designed rooms with multiple large screens. Virtual reality typically incorporates auditory and video feedback but may also allow other types of sensory and force feedback through haptic technology.

Augmented reality (AR) generally refers to an interactive experience of a real-world environment where the objects that reside in the real world are enhanced by computer-generated perceptual information, sometimes across multiple sensory modalities, including visual, auditory, haptic, somatosensory and olfactory. AR can be defined as a system that fulfills three basic features: a combination of real and virtual worlds, real-time interaction, and accurate 3D registration of virtual and real objects. The overlaid sensory information can be constructive (i.e. additive to the natural environment), or destructive (i.e. masking of the natural environment). This experience is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one.

A digital twin is a digital replica of a living or non-living physical entity. In general, a digital twin refers to a digital replica of potential and actual physical assets (physical twin), processes, people, places, systems and devices that can be used for various purposes. The digital representation provides both the elements and the dynamics of how an Internet of things device operates and lives throughout its life cycle.

Digital twins have two main characteristics: a connecting between the physical model and the corresponding virtual model or counterpart, and that this connection is established by generating real-time data using sensors. In general, digital twins integrate IoT, artificial intelligence, machine learning and software analytics with spatial network graphs to create living digital simulation models that update and change as their physical counterparts change. A digital twin continuously learns and updates itself from multiple sources to represent its near real-time status, working condition or position. This learning system learns from itself, using sensor data that conveys various aspects of its operating condition, from human experts, such as engineers with deep and relevant industry domain knowledge, from other similar machines, from other similar fleets of machines, and from the larger systems and environment of which it may be a part. A digital twin also integrates historical data from past machine usage to factor into its digital model.

Virtual surround is an audio system that attempts to create the perception that there are many more sources of sound than are actually present. Most recent examples of such systems are designed to simulate the true (physical) surround sound experience using one, two or three loudspeakers. Such systems are popular among consumers who want to enjoy the experience of surround sound without the large number of speakers that are traditionally required to do so.

3D audio effects are a group of sound effects that manipulate the sound produced by stereo speakers, surround-sound speakers, speaker-arrays, or headphones. This frequently involves the virtual placement of sound sources anywhere in three-dimensional space, including behind, above or below the listener.

SUMMARY

According to an aspect of the present invention, there is provided a computer-implemented method. The method comprises dynamically generating audio for one or more images associated with a location based on contextual information that satisfies a request; embedding the generated audio into the one or more images; and displaying the one or more images with the embedded audio on a user device

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize deficiencies current augmented and virtual reality systems. Specifically, embodiments of the present invention recognize that current augmented and virtual reality systems lack comprehensive ways to emulate audio and acoustics of a physical location. For example, traditional augmented and virtual reality systems typically do not focus on the way audio is conveyed or otherwise portrayed and experienced by the user. As such, users typically lack and cannot experience audio depicted in the recreated location. For example, augmented and virtual reality systems can recreate layouts of a building (e.g., rooms of a house), however, traditional augmented and virtual reality systems lack any means to depict how sounds (e.g., audio) reverberates in the structure and cannot accurately convey typical sounds associated with an area during certain conditions (e.g., during rain showers), certain occurrences (e.g., noise levels heard from the street), at different points of time in the day. As such, embodiments of the present invention provide solutions for the deficiencies augmented and virtual reality systems by emulating audio in a generated user interface designed to provide a user with a realistic representation of a location. For example, embodiments of the present invention can emulate audio by using digital twin simulations and collected contextual information as discussed in greater detail, later in this Specification. For example, some embodiments of the present invention can simulate how different noise levels affect certain locations and generate suggestions to improve (e.g., reduce) noise levels.

Contextual information, as used herein, refers to information regarding a location (e.g., an intended destination). As used herein, a location refers to a physical structure having one or more structural layouts with each layout including one or more objects (e.g., furniture, decorations, etc.). Examples of locations can include residential structures (e.g., houses, apartments, condominiums, etc.) as well as commercial structures (e.g., retail zoned buildings). Contextual information can also include materials used to build the structure and layouts of the structure (e.g., using wood versus carpeted flooring, sound deadening material, thickness of walls, etc.)

Contextual information can also include audio data collected from one or more Internet of Things (IoT devices) and one or more public or otherwise permissioned access databases associated with the location. Examples of audio data can include one or more audio files (e.g., pre-recorded sounds such as a stored library of audio files that can be recreated and played for a specific layout or location.

Contextual information can also include weather data (e.g., sun/rain/snow, humidity, cloud index, UV index, wind, dew point, pressure, visibility, etc.), luminosity (e.g., sun's position), time, GPS location, quantity of users in a location). Contextual information can further include information regarding objects at or within a proximity to a location (e.g., geotags for certain street signs, lights, billboards, benches, etc.). In this embodiment, weather data can be correlated to one or more audio files to simulate weather experienced in a particular location.

Contextual information can also include information about a location (e.g., location information). For example, location information can include hours of operation of a building, road closures, anticipated traffic based on scheduled events such as concerts, real-time traffic, queue status of locations such as restaurant wait times, user preferences, etc.

Embodiments of the present invention can utilize contextual information with permission from users via crowd-sourced data. For example, embodiments of the present invention can provide users with an opt-in/opt-out mechanism that allows embodiments of the present invention to collect and use information provided by the user (e.g., user-generated audio, user-uploaded images, user-generated tags, user copyright images, etc.). Some embodiments of the present invention can transmit a notification to the user each time information is collected or otherwise used.

Figure 1:
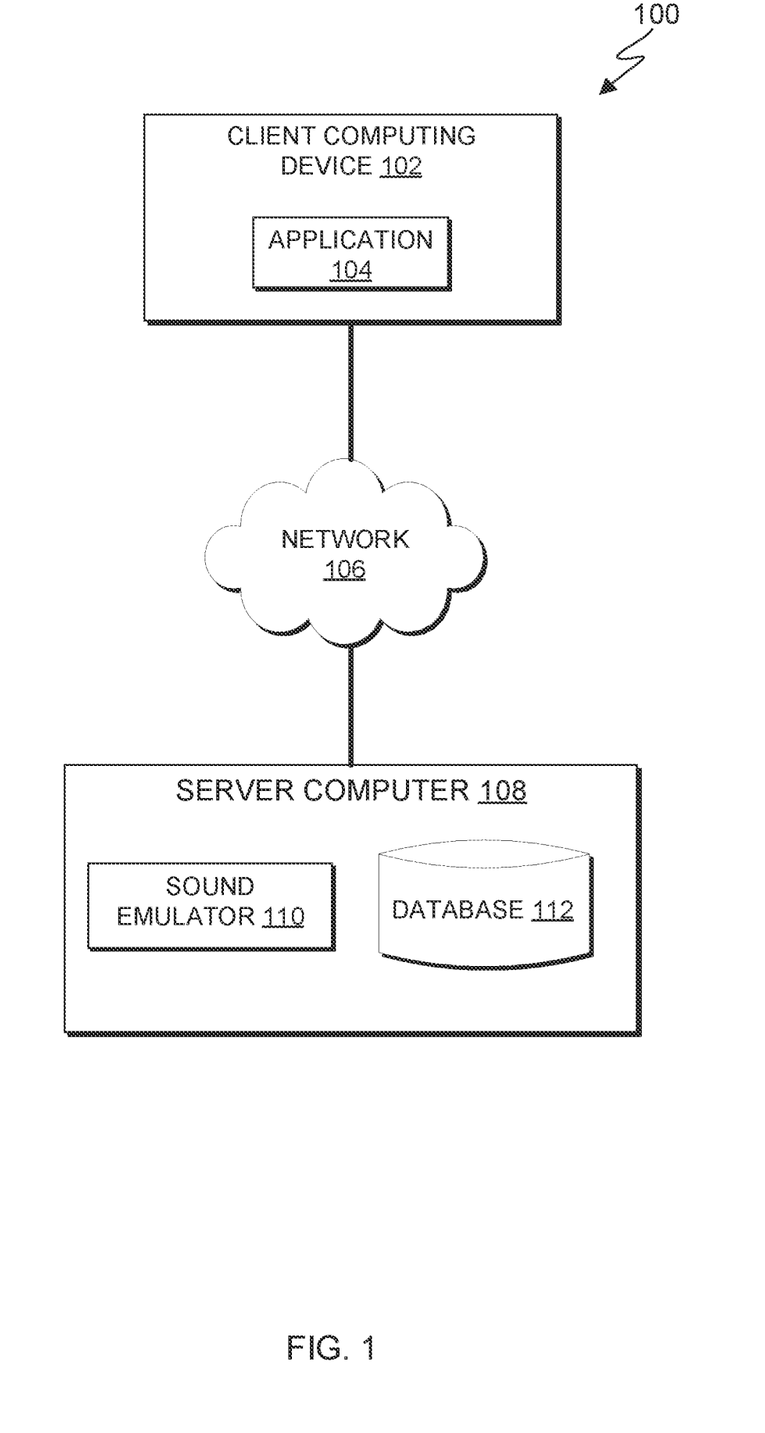
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access sound emulator 110 (e.g., using TCP/IP) to access content, user information, and database information. Application 104 can further communicate with sound emulator 110 to transmit instructions to generate and subsequently display computer rendered views that include audio simulations of a location that are contextually relevant to the user's viewpoint and current perspective as discussed in greater detail with regard to FIGS. 2-3.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts sound emulator 110 and database 112. In this embodiment, sound emulator 110 resides on server computer 108. In other embodiments, sound emulator 110 can have an instance of the program (not shown) stored locally on client computer device 102. For example, sound emulator 110 can be integrated with an existing augmented reality or virtual reality system installed on a client device. In other embodiments, sound emulator 110 can be a standalone program or system that generates one or more contextually relevant interfaces for a user to experience, wherein the interface displays layouts and accompanying audio simulations based on received user requests. In yet other embodiments, sound emulator 110 can be stored on any number or computing devices.

In this embodiment, sound emulator 110 generate and subsequently display computer rendered views that include audio simulations of a location that are contextually relevant to the user's viewpoint and current perspective. In this embodiment, sound emulator 110 can include a digital twin system (not shown) that is used to replicate a physical location.

For example, sound emulator 110 can receive information for a location that is a three-story house and accompanying layout of each level in the house. Specifically, the house includes a home theater and surround sound system on one of the floors of the house. Sound emulator 110 can recreate the received layout using digital twins. In this embodiment, sound emulator 110 can generate or otherwise recreate sounds outputted by the stereo system and include how the sounds react to other materials of the house using digital twin systems that collect varying levels of audio within the physical layout of the house. Sound emulator 110 can then adjust volume levels to account for and simulate what audio would sound like after other variables such as number of objects placed in the room, occupancy of the room, materials on the wall, etc. In some embodiments, sound emulator 110 can recreate audio as it would sound in the home with one or more persons being present in the room, can simulate background noise both inside and outside of the home (e.g., traffic sounds, traffic density, weather, etc.).

In this embodiment, sound emulator 110 dynamically simulates audio for a location using a digital twin of the location and integrating the simulated audio in one or more virtual and augmented reality system. For example, sound emulator 110 can simulate voices of one or more users in varying layouts of a location based on received information from a user. Using the digital twin system, sound emulator 110 can either passively or actively collect and subsequently reproduce audio (e.g., background noise, rain, lightning, sound emitted from certain light sources, obscured voices, etc.). In some embodiments, sound emulator 110 can further leverage digital twin systems to recreate certain lighting effects depicted in locations (e.g., to mimic certain lighting features or simulate other lighting options).

In this embodiment, received information refers generally to a received request to simulate audio experienced at an intended location. For example, received information can include requests to simulate variables such as weather related noise (e.g., rain, wind, weather related data, etc.), audio/sound generated by neighboring locations (e.g., homes), voices experienced both inside and outside of the location, traffic sounds during rush and off-peak hours. Received information can further include location information (e.g., hours of operation of a building, road closures, anticipated traffic based on scheduled events such as concerts, real-time traffic, queue status of locations such as restaurant wait times, user preferences, etc.), changes to information pertaining to the intended location (e.g., crowd-sourced location information that include road closures, predicted and actual traffic, changes to hours of operation).

In other embodiments, received information can be actively collected by sound emulator 110. For example, sound emulator 110 can invoke applications (that sound emulator 110 has permissioned access to) such as one or more cameras, smart devices, audio located within a location and record or otherwise capture a series of images and audio throughout different points of time. Finally, received information can also include user-generated content associated with the location as well as publicly available content. Specifically, received information can include one or more images and audio files associated with a location from one or more multiple perspectives and respective points in time. For example, user-generated content associated with a location can include multiple perspectives (e.g., different angles of the same location depicting multiple points of entry and multiple street views) at different points in time (e.g., during the day or night time).

Content can include one or more textual information, pictorial, audio, visual, and graphic information. Content can also include one or more files and extensions (e.g., file extensions such as .doc, .docx, .odt, .pdf, .rtf.txt, .wpd, etc. Content can further include audio (e.g., .m4a, .flac, .mp3, .mp4, .wave .wma, etc.) and visual/images (e.g., .jpeg, .tiff, .bmp, .pdf, .gif etc.).

In this embodiment, sound emulator 110 can then emulate audio experienced within a location using the received information. For example, sound emulator 110 generates audio emulations by determining contextually relevant information, prioritizing the relevant information, and generating images and respective audio emulations that match the contextual information as discussed in greater detail with respect to FIGS. 2 and 3. For example, a user can request audio emulations for Location A during the day. In this scenario, sound emulator 110 can dynamically generate and emulate audio that a user can experience at Location A during the day. Optionally, sound emulator 110 can generate and emulate audio for that same user to experience noises at Location A during nighttime.

In some embodiments sound emulator 110 can further generate one or more images or series of images that simulate events occurring at a location. For example, sound emulator 110 can generate images and associated audio with events such as celebrations including one or more users, game night, parties, dinner events, etc. In this embodiment, sound emulator 110 can optionally generate recommendations to place one or more user devices for optimal sound coverage. For example, sound emulator 110 can recognize certain objects depicted with received images of the location and target those recognized objects for determining an optimal placement that maximizes sound coverage. For example, Location A can include one or more speakers in the foyer of Location A. Sound emulator 110 can recognize the speakers and target the speakers for optimal placement calculations to determine an optimal placement of the speakers based on the number of users present and current location of users.

In other embodiments, sound emulator 110 can generate one or more graphic icons associated with identified objects (e.g., speakers or any other identifiable source of audio) associated with the location. Sound emulator 110 can then display the one or more generated graphic icons or otherwise overlay the one or more generated graphic icons over images representing a location for display in a virtual or augmented reality interface. Continuing the example, above, sound emulator 110 can generate an icon that highlights or otherwise flags the one or more speakers (e.g., identified objects) associated with the location. In response to a user selecting the generated graphical icon, sound emulator 110 can play audio associated with the identified object. In other embodiments, sound emulator 110 can display an option (in response to the generated graphical icon being selected) to optimize object placement (e.g., where the object is a speaker, optimize the location of the speakers to provide optimal coverage for the location, given the amount of users present and the location of currently present users).

Sound emulator 110 can then optionally refine the generated images. In this embodiment, sound emulator 110 can refine images using an iterative feedback loop. For example, sound emulator 110 can include a mechanism to solicit feedback from users to indicate either satisfaction (e.g., that the generated images were accurately replicated) or dissatisfaction (e.g., that the generated images were not accurately replicated). Sound emulator 110 can further solicit feedback based on the user's perceived accuracy of the generated image. For example, sound emulator 110 can solicit feedback with respect to accuracy of colors used, filters used, graphic icons generated, etc. In other embodiments, sound emulator 110 can leverage one or more IoT devices to collect user reactions and satisfaction levels (when given permission by users to do so).

In this embodiment, sound emulator 110 can automatically generate and otherwise automatically identify threshold levels of noise (e.g., audio) that users can tolerate. For example, in this embodiment, sound emulator 110 can identify respective users and classify users based on their preferences (e.g., age group, needs, vision, audio level preferences, color preferences, room acoustic preferences, etc.)

Sound emulator 110 can further index detected objects and acoustic properties (i.e., tolerance levels) of materials (e.g., wood type, marble, epoxies, lighting, fixtures such as blinds, curtains, AC units, wall paint, etc.), depicted within a location to generate recommendations to either increase or decrease sound dampening. For example, sound emulator 110 can generate a score that indicates a particular material would create an echo or reverberation louder than the user would prefer (e.g., meeting and/or exceeding a threshold score for noise) and subsequently recommend a different material to replace the material or otherwise alter the material to reduce noise levels. In this embodiment, sound emulator 110 utilizes a numeric scale where greater numbers indicate a higher noise score and lesser numbers indicate a lesser noise score (e.g., a quieter noise). In some instances, sound emulator 110 can further recommend one or more vendors to facilitate alterations to the location that would reduce noise levels or otherwise bring a location within acceptable threshold scores for noise levels. Where a location is being designed (e.g., not yet built and furnished with objects), sound emulator 110 can generate recommendations of materials to use to make the location into an area that satisfies a user's requirement for noise levels.

In some embodiments, sound emulator 110 can consider health parameters of users by simulating sounds (e.g., audio) that could affect the user's health and alert the user (prior to entering a location) of the possible sounds the user should be aware of. Sound emulator 110 can simultaneously alert the user of alternate locations that would meet threshold scores for tolerance of the respective user and generate recommendations to alter the location to bring the location within the threshold score of tolerance (e.g., threshold score for noise).

Database 112 stores received information and can be representative of one or more databases that give permissioned access to sound emulator 110 or publicly available databases. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
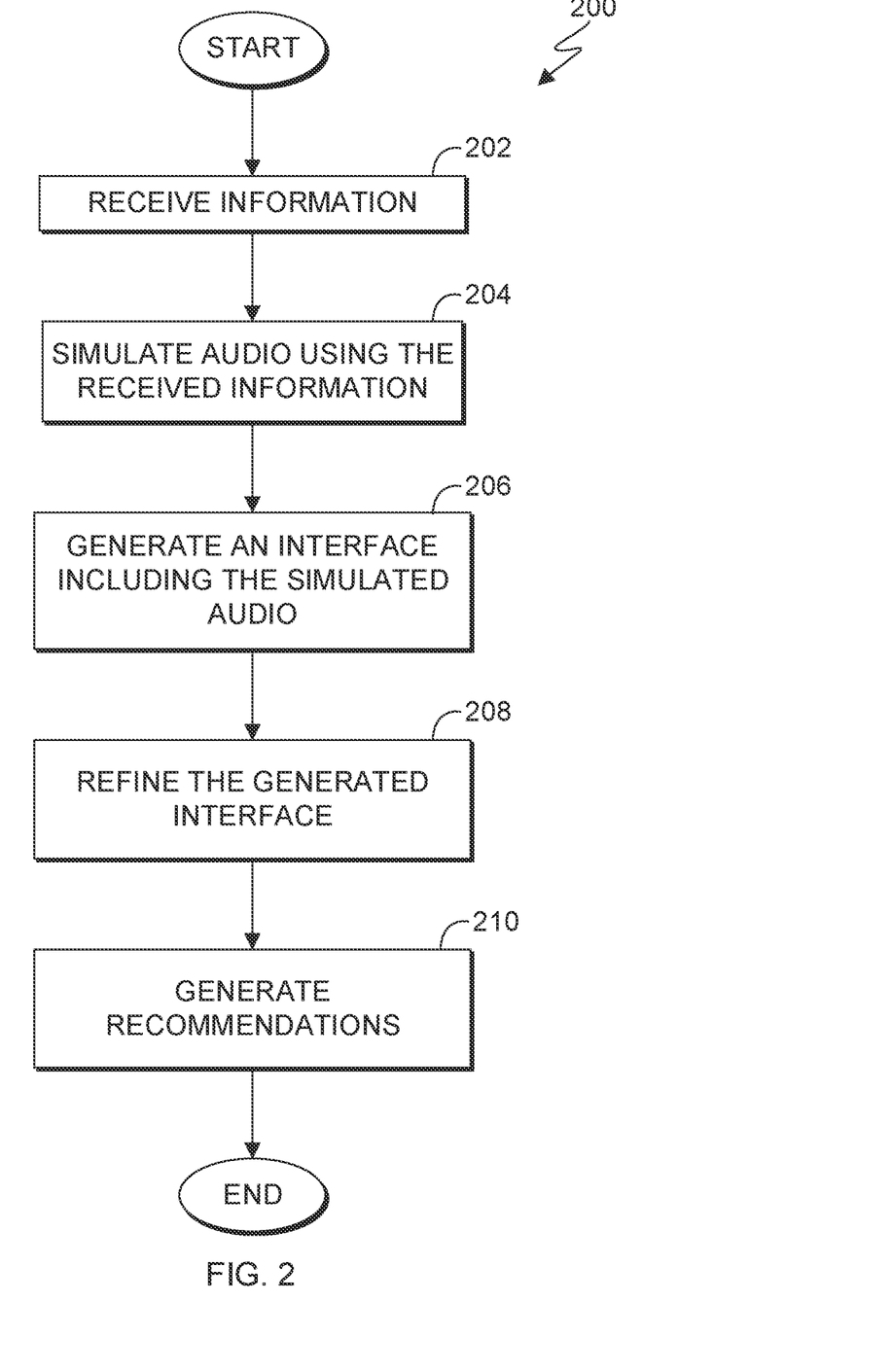
FIG. 2 is a flowchart depicting operational steps for creating a multivariate experience, in accordance with an embodiment of the present invention.

FIG. 2 is a flowchart 200 depicting operational steps for navigating a user to an intended location, in accordance with an embodiment of the present invention.

In step 202, sound emulator 110 receives information. In this embodiment, sound emulator 110 receives a request from client computing device 102. In other embodiments, sound emulator 110 can receive information from one or more other components of computing environment 100.

In this embodiment, information can include a request to emulate audio (e.g., by a user) for a location. The request can specify other contextual information, user preferences, location layouts, or, in other embodiments, sound emulator 110 can accesses other permissioned or otherwise publicly available databases for contextual information. Examples of user preferences can include user's preferences for certain audio levels of noise (e.g., a preference of muted outdoor sounds of rain, thunder, traffic, barking dogs, neighborhood noise, etc.)

The request can also include location layouts, materials used to furnish the location, and objects within the location. For example, the request can include that the location is a neighborhood that includes six hundred units in ten available models ranging from 1500 square feet to single family homes of 4500 square feet.

In step 204, sound emulator 110 simulates audio and generate one or more images using the received information. In this embodiment, sound emulator 110 can reference existing images associated with the intended location and leverage one or more artificial intelligence algorithms and Generative Adversarial Networks (GANs) to alter existing images or generate entirely new images of the intended location based on contextual information. Sound emulator 110 can then use digital twins to represent and recreate each received location.

Figure 3:
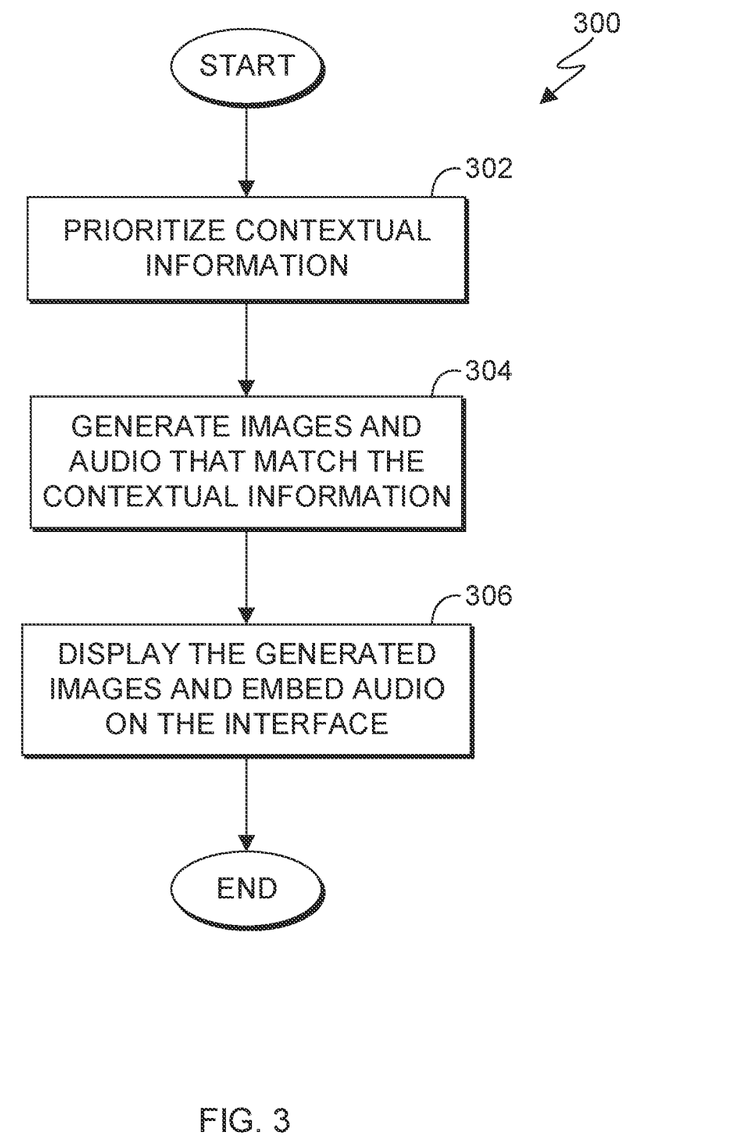
FIG. 3 is a flowchart depicting operational steps for generating and simulating audio, in accordance with an embodiment of the present invention.

In this embodiment, sound emulator 110 can emulate or otherwise recreate a sound for the generated one or more images by prioritizing contextual information, generating audio that matches the contextual information and then embed the generated audio to be displayed in an interface that allows a user to experience a location, as discussed in greater detail with respect to FIG. 3.

For example, a user may transmit a request to generate a virtual reality display of a physical location and emulate audio within the generated display that mimics audio experienced in the physical location. Sound emulator 110 can receive information (e.g., contextual information) that indicates the user would like day and nighttime views. Sound emulator 110 can then alter a daytime view of Location A to show what Location A would look like at night and generate audio associated with objects detected within the location to simulate what certain audio (i.e., noises) would sound like at the location.

In another example, sound emulator 110 can account for contextual information such as snow to alter the displayed image to show what the location and associated objects of the location would look like with snow either freshly laid or plowed and generate audio to accompany what snow plowing (a noise generated outside) would sound like from the inside of the location.

In step 206, sound emulator 110 generates an interface including the simulated audio. In this embodiment, sound emulator 110 generates an interface including the simulated audio associated with the generated images. In this embodiment, sound emulator 110 can generate an interface for display of an augmented or virtual reality display. Sound emulator 110 can then subsequently display the dynamically generated one or more images and accompanying emulated audio on a user device. In instances where sound emulator 110 has altered an image to better show objects (e.g., illuminated objects, signs, text, etc.), sound emulator 110 can replace the original image with the generated image. In instances where the identified object includes audio, sound emulator 110 can generate a graphic icon that, when selected, can play audio associated with the object. In instances where the object is stationary (e.g., a car parked outside), sound emulator 110 can generate an icon and subsequently overlay the generated icon over the object (e.g., the parked car) to generate engine start up noise of the parked car.

In step 208, sound emulator 110 refines the generated interface and simulated audio. In this embodiment, sound emulator 110 can refine images using an iterative feedback loop. For example, sound emulator 110 can include a mechanism to solicit feedback from users to indicate either satisfaction (e.g., that the generated images were accurately replicated) or dissatisfaction (e.g., that the generated images were not accurately replicated). FIG. 3 is a flowchart 300 depicting operational steps for generating contextual images, in accordance with an embodiment of the present invention.

Sound emulator 110 can refine the generated interface and simulated audio in response to a user request to simulate a certain sound at a particular point in time. For example, sound emulator 110 can receive a request to simulate rain generated noise that is experienced from within a location. Sound emulator 110 can then subsequently generate audio that is contextually relevant to the acoustics of the location to mimic what the rain would sound like if the user were physically at the location.

In step 210, sound emulator 110 generates recommendations. In this embodiment, sound emulator 110 can generate recommendations based on user profiles. In some embodiments, sound emulator 110 can generate recommendations that either reduce noise levels (e.g., to satisfy noise threshold) by suggesting alternate materials to use that would minimize noise levels (e.g., suggesting carpet versus hardwood floors or marble, etc.) or alter the look of a location by suggesting different objects (e.g., furniture) that would satisfy noise level requirements as well as the user's personal style. In yet other embodiments, sound emulator 110 can further suggest contractors to facilitate further action (e.g., to accomplish the reduced noise levels).

FIG. 3 is a flowchart 300 depicting operational steps for generating and simulating audio, in accordance with an embodiment of the present invention.

In step 302, sound emulator 110 prioritizes contextual information. In this embodiment, sound emulator 110 prioritizes contextual information according to user preferences. For example, sound emulator 110 can access user preferences that includes an order of audio preferences and concerns of the user as well as one or more audio systems. For example, sound emulator 110 can access user preferences to identify user concerns about neighborhood noise, creaking floors, and acoustics of a room furnished with a home entertainment system. Sound emulator 110 can then prioritize noises and sound emulation associated with the user's concerns as part of a sound package embedded within an augmented or virtual reality interface display.

In other embodiments, sound emulator 110 can access a list of standard audio preferences. For example, sound emulator 110 can access a list containing threshold levels of noise tolerances for respective audio (e.g., noise levels for neighborhood sounds, traffic, creaking, fan noise, AC noise, weather noise, etc.). In yet other embodiments, sound emulator 110 can use one or more artificial intelligence and machine learning algorithms to determine priorities of contextual information.

In step 304, sound emulator 110 generate images and audio that match the contextual information. In this embodiment, sound emulator 110 generate images that match the contextual information by matching identified contextual factors to one or more images displaying contextual factors. For example, sound emulator 110 can receive a request to generate an augmented reality or virtual reality display for a particular room in a location. Sound emulator 110 can receive and subsequently prioritize received contextual information. For example, in instances where sound emulator 110 receives contextual information detailing objects of a room capable of producing sound and a preference to hear neighborhood sounds (outside of the location) while inside the room, sound emulator 110 can recreate the room's layout including the one or more devices capable of emitting sound and embed appropriate audio coming from the one or more objects. Specifically, in instances where sound emulator 110 can identify a type of stereo/speaker, sound emulator 110 can match the identified type of stereo to audio emitted by the stereo/speaker. Sound emulator 110 can then modify the generated audio to match the acoustics of the room (e.g., sound emulator 110 can then modify the sound emitted from the stereo to account for furniture in the room, the type of materials used for the floor, wall material such as wallpaper, paint, insulation, type of window, etc.). In instances where there is saved audio surrounding the location (e.g., raindrops, wind, neighborhood noise), sound emulator 110 can retrieve the saved audio and embed the saved audio into the augmented or virtual reality display. In instances where there is no saved audio, sound emulator 110 can retrieve stock or default noises to simulate the noises and the interaction of the generated noises with the materials associated with the location.

In instances where sound emulator 110 does not receive a layout of the room, prior, sound emulator 110 can identify objects depicted in a picture of the location using object recognition algorithms and generate corresponding images in augmented or virtual reality displays. Sound emulator 110 can then generate one or more images by leveraging one or more artificial intelligence algorithms and Generative Adversarial Networks (GANs). For example, where no, nighttime image of a location is located, sound emulator 110 can apply one or more filters to mimic a nighttime environment of the location and subsequently alter the image to better show objects (e.g., illuminated objects, signs, text, etc.).

In some embodiments, sound emulator 110 can alter generated images based on contextual information. For example, sound emulator 110 can alter generated images that match or otherwise correspond to the physical layout of the location to display day and nighttime views of the location. In some instances, sound emulator 110 can alter furnishings of the location based on contextual information. For example, where sound emulator 110 has mimicked furnishings of the physical room, styled in midcentury modern furnishings, sound emulator 110 can alter the display of the room to be furnished with contemporary furnishings. In other embodiments, sound emulator 110 can alter the furnishings of other styles like modern, Scandinavian, rustic, bohemian, etc.

Sound emulator 110 can further alter the generated images to simulate different events at the location. An event as used herein refers to a series of planned or unplanned actions and gatherings. For example, sound emulator 110 can alter the generated images of the location (e.g., a room) to simulate a birthday celebration, a dinner, game night, move night, etc. In some instances, sound emulator 110 can generate images of one or more users to simulate interactions of users at the location and appropriately emulate audio associated with the generated images (e.g., emulate audio of multiple users within the room and well as emulate any audio emitting from one or more devices).

In step 306, sound emulator 110 displays the generated images and audio on the interface. In this embodiment, sound emulator 110 displays the generated images and embeds the generated audio associated with the generated images on an augmented reality or virtual reality device. In other embodiments, sound emulator 110 can display the generated images and audio on a display screen and use the user's speakers to play the associated audio.

Figure 4:
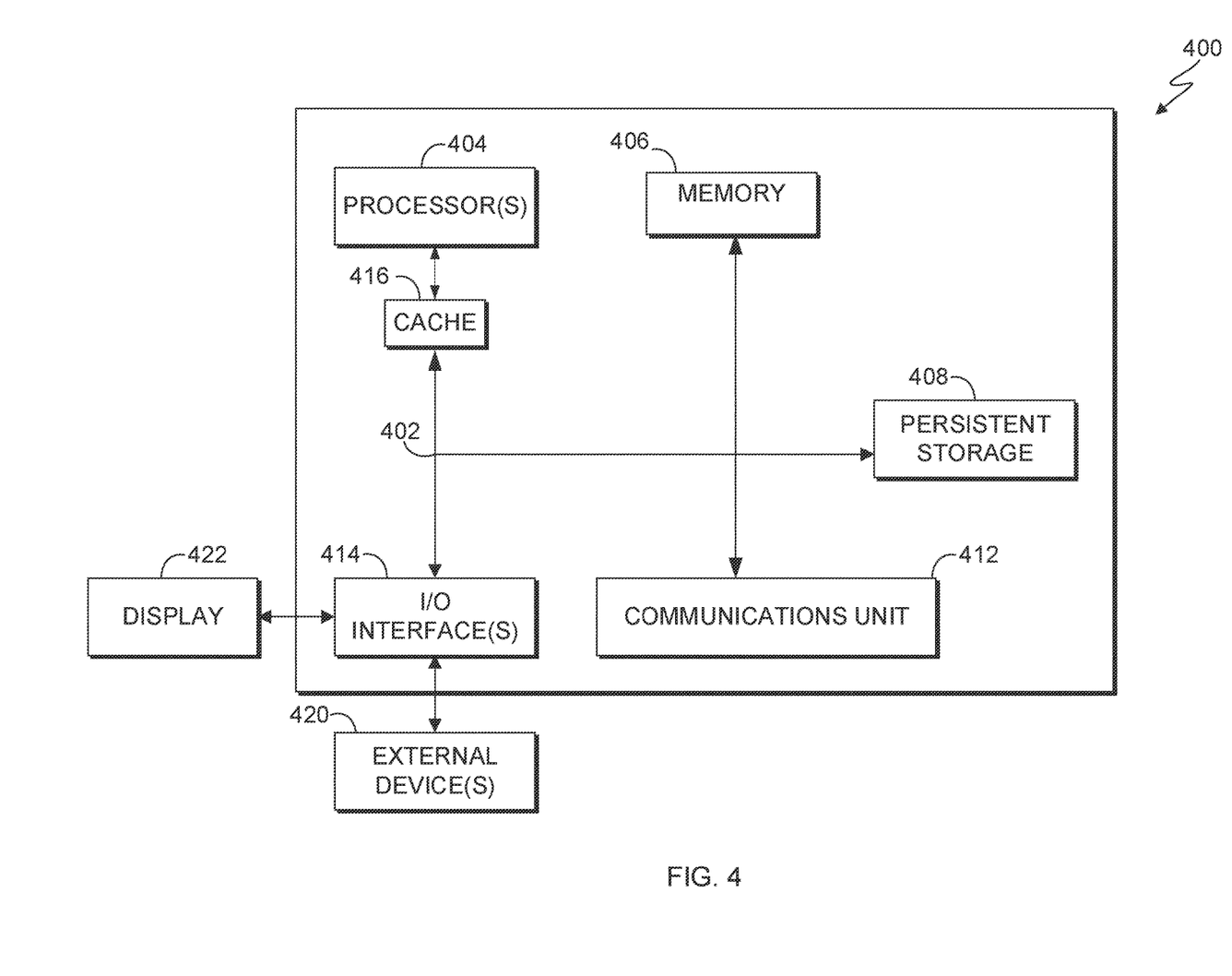
FIG. 4 is a block diagram of an example system, in accordance with an embodiment of the present invention.

FIG. 4 depicts a block diagram of components of computing systems within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 400 includes communications fabric 402, which provides communications between cache 416, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Sound emulator 110 (not shown) may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Sound emulator 110 may be downloaded to persistent storage 408 through communications unit 412.

I/O interface(s) 414 allows for input and output of data with other devices that may be connected to client computing device and/or server computer. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., sound emulator 110, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving a request to emulate audio for a location having unknown acoustic properties:
in response to receiving the request to emulate audio for a location having unknown acoustic properties, dynamically generating audio for one or more images associated with the location, based on contextual information that satisfies the request;
embedding the generated audio into the one or more images;
emulating audio in a generated user interface that provides a realistic representation of the location using the embedded audio to simulate interactions of generated noises with materials associated with the one more images at different points in time and in varying weather conditions in response to user interactions with the one or more images;
implementing a feedback mechanism that solicits feedback indicating perceived accuracy for the one or more images associated with the emulated audio that simulates interactions of generated noises with materials associated with the one or more images and interactions of users;
receiving solicited feedback indicating a perceived accuracy for the one or more images associated with the emulated audio;
in response to receiving the solicited feedback indicating the perceived accuracy for the one or more images associated with the emulated audio, altering a depiction of the one or more images to increase an accuracy of depictions of the one or more images and corresponding emulated audio;
considering health parameters of a user by altering the location to be within a threshold score for tolerance prior to the user entering the location, based on the health parameters of the user;
generating one or more recommendations that alter the location to be within a threshold score of audio level; and alerting the user of alternate locations that meet the threshold score for tolerance.

2. The computer-implemented method of claim 1, wherein dynamically generating audio for one or more images associated with a location based on contextual information that satisfies a request comprises:
  prioritizing contextual information associated with the location;
  generating one or more images that match the contextual information; and
  generating audio associated with the one or more generated images that match the contextual information.

3. The computer-implemented method of claim 2, further comprising:
  simulating different events at the location by altering at least one object of a plurality of identified objects based on contextual information,
  wherein an event simulates interactions of users at the location, and
  wherein altering at least one object comprises:
    generating one or more images to represent the event; and
    embedding audio representative of audio emitted by the generated one or more images representing the event.

4. The computer-implemented method of claim 3, further comprising:
  indexing the plurality of identified objects based on acoustic properties of each identified object of the plurality of identified objects.

5. The computer-implemented method of claim 3, further comprising:
  generating one or more graphical icons to be overlaid on the one or more generated images that represents at least one object of the plurality of objects;
  overlaying the at least one or more generated graphical icons over a generated image of the one or more generated images displayed on the user device; and
  in response to selecting at least one generated graphical icon of the generated one or more graphical icons, playing audio associated with a respective object of the plurality of objects.

6. The computer-implemented method of claim 1, further comprising:
  generating a score that indicates a noise level associated with an object depicted in respective images of the one or more images; and
  in response to the generated score meeting or exceeding a threshold score for the noise level, identifying one or more replacement objects that are functionally equivalent;
  generating a graphic representation of at least one replacement object of the one or more replacement objects that are functionally equivalent;
  embedding audio associated with the generated graphic representation; and
  displaying the graphic representation as an interactive object to a user.

7. The computer-implemented method of claim 1, further comprising:
  generating recommendations to place one or more objects to optimize audio coverage based on number of users present and current location of each of the users that are present.

8. The computer-implemented method of claim 1, further comprising:
  generating a score that indicates a material of the materials associated with the one or more images has a noise level greater than a threshold score for the noise level based on user preference; and
  recommending an alternative material to replace the material or otherwise alter the material to reduce noise levels.

9. A computer program product comprising:
  one or more computer readable storage media and program instructions stored on the one or more computer readable storage media, the program instructions comprising:
  program instructions to receive a request to emulate audio for a location having unknown acoustic properties:
  program instructions to, in response to receiving the request to emulate audio for a location having unknown acoustic properties, dynamically generate audio for one or more images associated with the location, based on contextual information that satisfies the request;
  program instructions to embed the generated audio into the one or more images;
  program instructions to emulate audio in a generated user interface that provides a realistic representation of the location using the embedded audio to simulate interactions of generated noises with materials associated with the one more images at different points in time and in varying weather conditions in response to user interactions with the one or more images;
  program instructions to implement a feedback mechanism that solicits feedback indicating perceived accuracy for the one or more images associated with the emulated audio that simulates interactions of generated noises with materials associated with the one or more images and interactions of users;
  program instructions to receive solicited feedback indicating a perceived accuracy for the one or more images associated with the emulated audio;
  program instructions to, in response to receiving the solicited feedback indicating the perceived accuracy for the one or more images associated with the emulated audio, alter a depiction of the one or more images to increase an accuracy of depictions of the one or more images and corresponding emulated audio;
  program instructions to consider health parameters of a user by altering the location to be within a threshold score for tolerance prior to the user entering the location, based on the health parameters of the user;
  program instructions to generate one or more recommendations that alter the location to be within a threshold score of audio level; and
  program instructions to alert the user of alternate locations that meet the threshold score for tolerance.

10. The computer program product of claim 9, wherein the program instructions to dynamically generating audio for one or more images associated with a location based on contextual information that satisfies a request comprise:
  program instructions to prioritize contextual information associated with the location;
  program instructions to generate one or more images that match the contextual information; and
  program instructions to generate audio associated with the one or more generated images that match the contextual information.

11. The computer program product of claim 10, wherein the program instructions stored on the one or more computer readable storage media further comprise:
program instructions to simulate different events at the location by altering at least one object of a plurality of identified objects based on contextual information, wherein an event simulates interactions of users at the location, and
wherein the program instructions to alter at least one object comprise:
program instructions to generate one or more images to represent the event; and
program instructions to embed audio representative of audio emitted by the generated one or more images representing the event.

12. The computer program product of claim 11, wherein the program instructions stored on the one or more computer readable storage media further comprise:
program instructions to index the plurality of identified objects based on acoustic properties of each identified object of the plurality of identified objects.

13. The computer program product of claim 11, wherein the program instructions stored on the one or more computer readable storage media further comprise:
program instructions to generate one or more graphical icons to be overlaid on the one or more generated images that represents at least one object of the plurality of objects;
program instructions to overlay the at least one or more generated graphical icons over a generated image of the one or more generated images displayed on the user device; and
program instructions to, in response to selecting at least one generated graphical icon of the generated one or more graphical icons, play audio associated with a respective object of the plurality of objects.

14. The computer program product of claim 9, wherein the program instructions stored on the one or more computer readable storage media further comprise:
program instructions to generate a score that indicates a noise level associated with an object depicted in respective images of the one or more images; and
program instructions to, in response to the generated score meeting or exceeding a threshold score for the noise level, identify one or more replacement objects that are functionally equivalent;
program instructions to generate a graphic representation of at least one replacement object of the one or more replacement objects that are functionally equivalent;
program instructions to embed audio associated with the generated graphic representation; and
program instructions to display the graphic representation as an interactive object to a user.

15. A computer system comprising:
one or more computer processors;
one or more computer readable storage media; and
program instructions stored on the one or more computer readable storage media for execution by at least one of the one or more computer processors, the program instructions comprising:
program instructions to receive a request to emulate audio for a location having unknown acoustic properties;
program instructions to, in response to receiving the request to emulate audio for a location having unknown acoustic properties, dynamically generate audio for one or more images associated with the location, based on contextual information that satisfies the request;
program instructions to embed the generated audio into the one or more images;
program instructions to emulate audio in a generated user interface that provides a realistic representation of the location using the embedded audio to simulate interactions of generated noises with materials associated with the one more images at different points in time and in varying weather conditions in response to user interactions with the one or more images;
program instructions to implement a feedback mechanism that solicits feedback indicating perceived accuracy for the one or more images associated with the emulated audio that simulates interactions of generated noises with materials associated with the one or more images and interactions of users;
program instructions to receive solicited feedback indicating a perceived accuracy for the one or more images associated with the emulated audio;
program instructions to, in response to receiving the solicited feedback indicating a perceived accuracy for the one or more images associated with the emulated audio, alter a depiction of the one or more images to increase an accuracy of depictions of the one or more images and corresponding emulated audio;
program instructions to consider health parameters of a user by altering the location to be within a threshold score for tolerance prior to the user entering the location, based on the health parameters of the user;
program instructions to generate one or more recommendations that alter the location to be within a threshold score of audio level; and
program instructions to alert the user of alternate locations that meet the threshold score for tolerance.

16. The computer system of claim 15, wherein the program instructions to dynamically generating audio for one or more images associated with a location based on contextual information that satisfies a request comprise:
program instructions to prioritize contextual information associated with the location;
program instructions to generate one or more images that match the contextual information; and
program instructions to generate audio associated with the one or more generated images that match the contextual information.

17. The computer system of claim 16, wherein the program instructions stored on the one or more computer readable storage media further comprise:
program instructions to simulate different events at the location by altering at least one object of a plurality of identified objects based on contextual information, wherein an event simulates interactions of users at the location, and
wherein the program instructions to alter at least one object comprise:
program instructions to generate one or more images to represent the event; and
program instructions to embed audio representative of audio emitted by the generated one or more images representing the event.

18. The computer system of claim 17, wherein the program instructions stored on the one or more computer readable storage media further comprise:
program instructions to index the plurality of identified objects based on acoustic properties of each identified object of the plurality of identified objects.

19. The computer system of claim 17, wherein the program instructions stored on the one or more computer readable storage media further comprise:
- program instructions to generate one or more graphical icons to be overlaid on the one or more generated images that represents at least one object of the plurality of objects;
- program instructions to overlay the at least one or more generated graphical icons over a generated image of the one or more generated images displayed on the user device; and
- program instructions to, in response to selecting at least one generated graphical icon of the generated one or more graphical icons, play audio associated with a respective object of the plurality of objects.

* * * * *